(12) United States Patent
Hansen et al.

(10) Patent No.: US 8,942,768 B2
(45) Date of Patent: Jan. 27, 2015

(54) METHOD AND SYSTEM FOR DETERMINING AND DISPLAYING A TEXT TITLE

(75) Inventors: Timothy Hansen, Folsom, CA (US); Bran Ferren, Beverly Hills, CA (US)

(73) Assignee: Intel Corporation, Santa Clara, CA (US)

( * ) Notice: Subject to any disclaimer, the term of this patent is extended or adjusted under 35 U.S.C. 154(b) by 503 days.

(21) Appl. No.: 12/646,366

(22) Filed: Dec. 23, 2009

(65) Prior Publication Data

US 2010/0317327 A1  Dec. 16, 2010

Related U.S. Application Data

(60) Provisional application No. 61/187,520, filed on Jun. 16, 2009.

(51) Int. Cl.
*H04B 1/38* (2006.01)
*H04L 12/58* (2006.01)

(52) U.S. Cl.
CPC .............. *H04L 12/587* (2013.01); *H04L 51/24* (2013.01)

USPC .......................... 455/566; 455/466; 455/414.1

(58) Field of Classification Search
CPC ...... H04M 1/72519; H04W 4/12; H04W 4/18
USPC .................................................. 455/566, 466
See application file for complete search history.

(56) References Cited

U.S. PATENT DOCUMENTS

| | | | |
|---|---|---|---|
| 7,054,669 B2 * | 5/2006 | Ito ................................. | 455/566 |
| 2006/0146011 A1 * | 7/2006 | Pihlaja et al. .................. | 345/156 |
| 2006/0211454 A1 * | 9/2006 | Park et al. ...................... | 455/566 |
| 2009/0016506 A1 * | 1/2009 | Brown et al. ............. | 379/112.01 |
| 2009/0177617 A1 * | 7/2009 | Lee .................................. | 707/1 |

* cited by examiner

*Primary Examiner* — Wayne Cai
(74) *Attorney, Agent, or Firm* — Kacvinsky Daisak Bluni PLLC

(57) ABSTRACT

A method and system may receive a communication message and determine a text title to associate with the communication message. The text title associated with the communication message may be displayed.

20 Claims, 6 Drawing Sheets

METHOD AND SYSTEM FOR DETERMINING AND DISPLAYING A TEXT TITLE

PRIORITY INFORMATION

This application claims priority to the commonly-owned co-pending provisional patent application U.S. Ser. No. 61/187,520, entitled "Multi-Mode Handheld Electronic Device", filed Jun. 16, 2009. This application is also related to U.S. patent application Ser. No. 12/646,343, entitled "A Secondary Display Device", filed Dec. 23, 2009.

BACKGROUND

There are many types of communication messages which may be received on a mobile phone. For example, a user on a mobile device may send a text message to another user on a mobile device. Alternatively, a user on a computing device may send an electronic mail message to the user on the mobile device. In yet another embodiment, a user on a stationary device may call the user and leave a voice message on the mobile device. However, the user receiving these different types of messages on a mobile device does not have a way to quickly determine the subject matter and/or prioritize the communication message.

DETAILED DESCRIPTION

Various embodiments may be generally directed to an apparatus, system and method for determining and displaying a text title. In one embodiment, for example, a communication message may be received and a text title associated with the communication message may be determined. The text title associated with the communication message may be displayed. In this manner, communication messages will be displayed for a user allowing the user to quickly view a summary of the communication message. In one embodiment, messages may be prioritized and a user may be able to quickly determine the purpose or substance of communication message.

In an embodiment, for example, the text title may be displayed on a secondary screen on a side of a mobile device. A mobile device may include a primary screen on a face of a device and a secondary screen on a side of the device. In one embodiment, the secondary screen may display a text title. A user may simply look at the edge of the device, without having to further interact with the device, to determine basic information about the communication message. In one embodiment, a mobile device may include a primary unit and a secondary unit. The primary unit may include a processor, a memory and a wireless interface subsystem. The secondary unit may be coupled to the primary unit. The secondary unit may include a prism and a display coupled to the prism.

Other embodiments may be described and claimed. Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
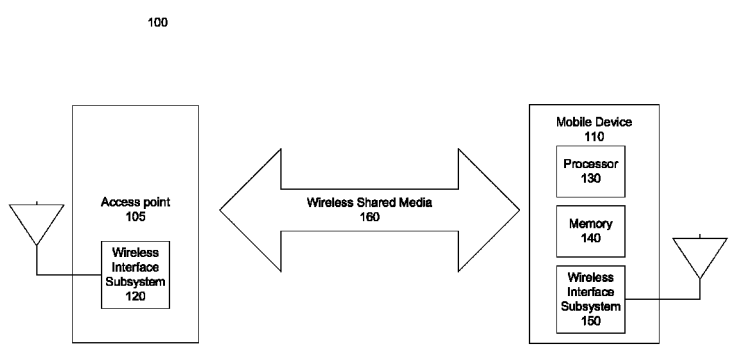
FIG. 1 illustrates one embodiment of a system.

FIG. 1 illustrates one embodiment of a system. FIG. 1 illustrates a block diagram of one embodiment of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation.

In various embodiments, the communications system 100 may comprise, or form part of a wired communications system, a wireless communications system, or a combination of both. For example, the communications system 100 may include one or more nodes arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes arranged to communicate information over one or more types of wireless communication links, such as wireless shared media 140. Examples of a wireless communication link may include, without limitation, a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one or more wireless interface subsystems and/or components for wireless communication, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple elements, such as an access point 105 and a mobile device 110 which communicate via wireless shared media 160. As shown by an access point 105, the access point may include a wireless interface subsystem 120. As shown by the mobile device 110, the mobile device 110 may include a processor 130, a memory unit 140, and a wireless interface subsystem 150. The embodiments, however, are not limited to the elements shown in FIG. 1.

In various embodiments, the communications system 100 may comprise or be implemented as a mobile broadband communications system. Examples of mobile broadband communications systems include, without limitation, systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. In one embodiment, for example, the communications system 100 may be implemented in accordance with the Worldwide Interoperability for Microwave Access (WiMAX) or WiMAX II standard. WiMAX is a wireless broadband technology based on the IEEE 802.16 standard of which IEEE 802.16-2004 and the 802.16e amendment (802.16e Cor2/D3-2005) are Physical (PHY) layer specifications. WiMAX II is an advanced Fourth Generation (4G) system based on the IEEE 802.16m and IEEE 802.16j proposed standards for International Mobile Telecommunications (IMT) Advanced 4G series of standards. Although some embodiments may describe the communications system 100 as a WiMAX or WiMAX II system or standards by way of example and not limitation, it may be appreciated that the communications system 100 may be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, 3rd Generation Partnership Project (3GPP) Rel. 8 and 9 of Long Term Evolution (LTE)/System Architecture Evolution (SAE) and so forth. The embodiments are not limited in this context.

In various embodiments, the communications system 100 may comprise an access point 105 having wireless capabilities. Although not explicitly illustrated in FIG. 1, access point 105 may include, for example, a structure that is similar to mobile device 110, including one or more of a processor, a memory, and software provided in memory to allow the access point 105 to perform a variety of functions.

In various embodiments, the communications system 100 may comprise a set of mobile devices 110 having wireless capabilities. The mobile devices 110 may comprise a generalized equipment set providing connectivity to other wireless devices, such as other mobile devices or an access point (e.g., access point 105). Examples for the mobile devices 110 may include, without limitation, a computer, server, workstation, notebook computer, handheld computer, telephone, cellular telephone, personal digital assistant (PDA), combination cellular telephone and PDA, and so forth. In one embodiment, for example, the mobile devices 110 may be implemented as mobile subscriber stations (MSS) for a WMAN. Although some embodiments may be described with the mobile devices 110 implemented as a MSS by way of example, it may be appreciated that other embodiments may be implemented using other wireless devices as well. The embodiments are not limited in this context.

As shown by the mobile device 110, the mobile device 110 may comprise a processor 130. The processor 130 may be implemented as any processor, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor 135 may be implemented as a general purpose processor, such as a processor made by Intel® Corporation, Santa Clara, Calif. The processor 130 may be implemented as a dedicated processor, such as a controller, microcontroller, embedded processor, a digital signal processor (DSP), a network processor, a media processor, an input/output (I/O) processor, and so forth. The embodiments are not limited in this context.

As further shown by the mobile device 110, the mobile device 110 may comprise a memory unit 140. The memory 140 may comprise any machine-readable or computer-readable media capable of storing data, including both volatile and non-volatile memory. For example, the memory 140 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of the memory 140 may be included on the same integrated circuit as the processor 130, or alternatively some portion or all of the memory 140 may be disposed on an integrated circuit or other medium, for example a hard disk drive, that is external to the integrated circuit of the processor 130. In an embodiment, the memory may include data and instructions to operate the processor. The embodiments are not limited in this context.

In various embodiments, the mobile device 110 and the fixed device 105 may communicate information over wireless shared media 160 via respective wireless interface subsystems 120, 150. The wireless shared media 160 may comprise one or more allocations of RF spectrum. The allocations of RF spectrum may be contiguous or non-contiguous. In some embodiments, the wireless interface subsystems 120, 150 may communicate information over the wireless shared media 160 using various multicarrier techniques utilized by, for example, WiFi, general packet radio service (GPRS), long term evolution (LTE) technologies, WiMAX and/or WiMAX II systems. In general operation, the wireless interface subsystem 120, 150 may communicate information using one or more communications channels. A communication channel may be a defined set of frequencies, time slots, codes, or combinations thereof.

In various embodiments, system 100 may include an access point 105 and a mobile device 110. The mobile device 110 may connect to the access point 105 over the wireless shared media 160. One or more logical or physical channels may be established to communicate information. The information may include media information and control information. Media information may refer to any data representing content meant for a user. Examples of content may include, for example, data from a voice conversation, videoconference, streaming video, electronic mail ("e-mail") message, voice mail message ("voice message"), alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner.

Figure 2:
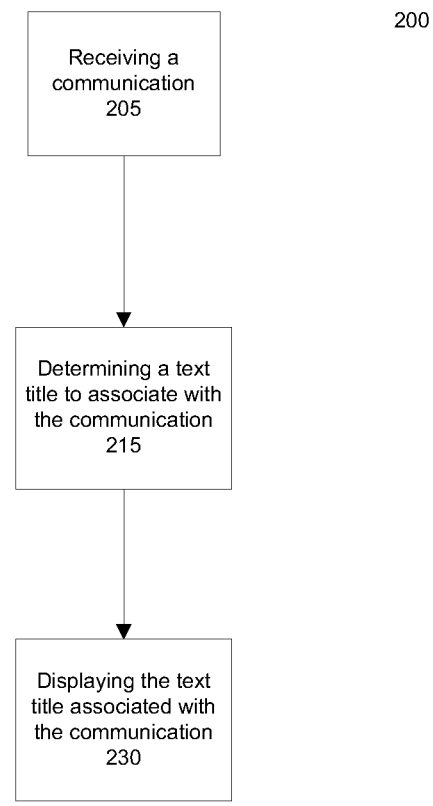
FIG. 2 illustrates one embodiment of a logic diagram of receiving a text title.

FIG. 2 illustrates one embodiment of a logic flow. FIG. 2 illustrates a logic flow 200. Logic flow 200 may be representative of the operations executed by one or more embodiments described herein. As shown in logic flow 200, a communication message may be received 205. In one embodiment, a mobile device may receive 205 a communication message via a device including, but not limited to, another mobile device, a land line phone, a mobile computing device, and/or a fixed computing device.

The mobile device may receive 205 a variety of different types of communication messages. In one embodiment, a mobile device may receive a phone call which may become a voice mail or voice message if the phone is not answered. In one embodiment, a mobile device may receive an electronic mail message. In one embodiment, the mobile device may receive a text message. The embodiments, however, are not limited to these examples.

In one embodiment, a text title to associate with the communication message may be determined 215. In one embodiment, the user of the mobile device may choose the type of information included in the text title. In one embodiment, the sender of the call may choose the type of information displayed in the text of the text title. In one embodiment, the device may have a default or preset setting for what type of information is included and/or displayed in the text title.

In one embodiment, a priority level may be included in a text title. In one embodiment, the text title may include a symbol or special characters such as, but not limited to a, flag or exclamation mark. For example, a flag may be included in the text title to indicate urgency. In one embodiment, the text title may include, but not limited to, a numeric value, a color code, an alpha sequence, or a brightness setting. For example, the text for the text title may be displayed in the color red and may represent an important voice message. For example, the number 3 may be included in the text of a text title to indicate a low priority communication. In one embodiment, a priority level could be spoken by the sender in a verbal communication message. A spoken priority level may be converted into text via a speech recognition program. For example, a sender may state the priority level of the call after leaving a voice message and the priority level may be included in the text title.

In one embodiment, a text title may be or include words associated with the communication message. In one embodiment, in addition to displaying the text title, an alert may sound from the mobile device. An alert may be a vibration or a sound emanating from the mobile device. For example, the device may emanate a beeping sound. In one embodiment, the alert may be provided based on the priority of the communication message.

Figure 3:
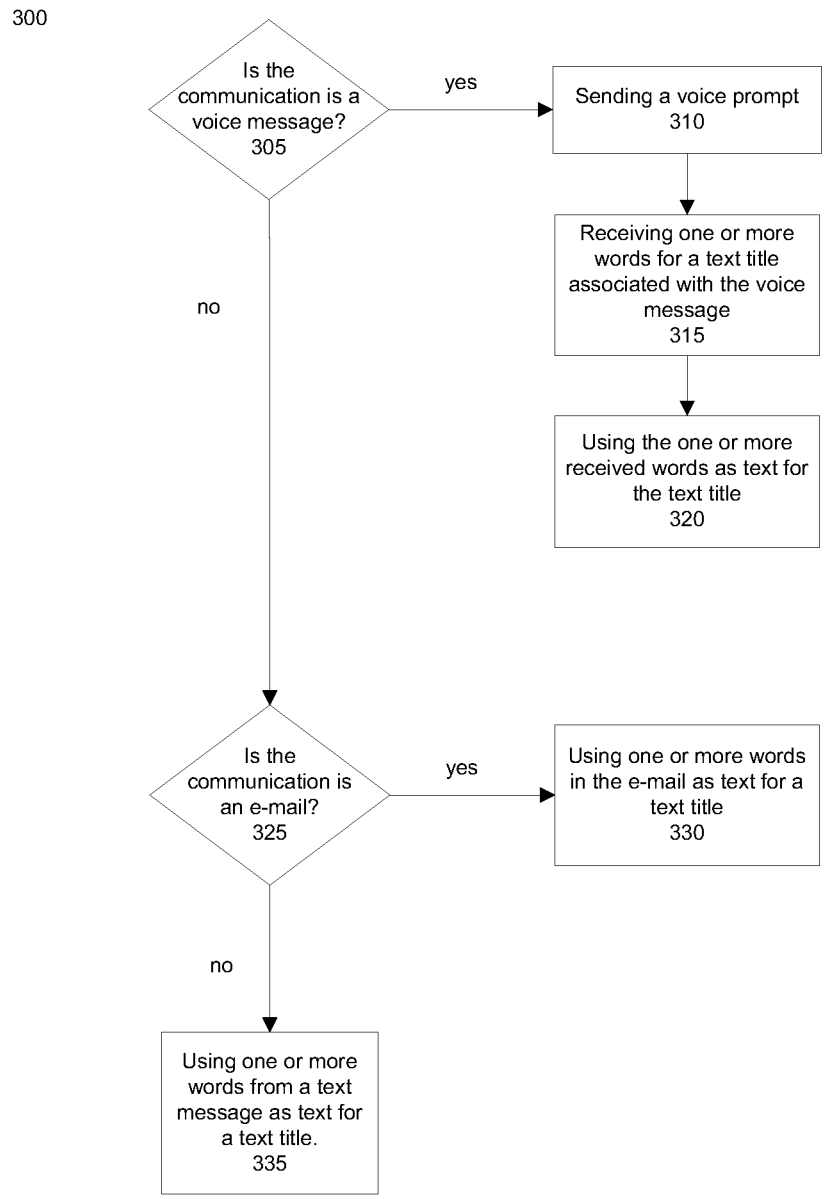
FIG. 3 illustrates one embodiment of logic diagram of determining a text title.

FIG. 3 illustrates one embodiment of a flow chart for determining a text title for the communication message. FIG. 3 illustrates a logic flow 300. In one embodiment, in order to determine the text title, the type of communication message received may be determined. It may be determined 305 whether the communication message is in the form of a voice message. In one embodiment, if the communication message is in the form of a voice message, a voice prompt may be sent 310 to the sender to ask the sender if they want to create a text title. In one embodiment, a voice prompt may be sent to the sender only after the sender requests the prompt. In one embodiment, the sender may press a button on his/her mobile device signaling that he/she wants to create a text title. In one embodiment, the sender may vocally state that he/she wants to create a text title. In one embodiment, a voice prompt may be sent to the sender without the sender initiating the prompt. In one embodiment, the sender may respond to the voice prompt by communicating that the sender wants to leave a text title associated with their voice message.

One or more words may be received 315 for a text title associated with the voice message. In one embodiment, the words received may be typed words that the sender wants to display in the text title. The one or more received words may be used 320 as text for the text title. The one or more received words may be parsed, edited and/or shortened to fit as text in the text title. In one embodiment, the text in the text title may be less than a certain maximum number of characters. In one embodiment, abbreviations may be used in text in the text title. In one embodiment, pronouns and/or prepositions may be excluded from the text in the text title to decrease the word count. The embodiments, however, are not limited to these examples. For example, the sender could write "Son sick at home". The received words may then be taken out of the format received and used 320 as text for the text title. In one embodiment, the text received 315 may be in the form of a text message or e-mail message associated with the voice message.

In one embodiment, spoken words may be received 315. In one embodiment, the words received may be spoken words that the sender wants to be displayed in the text title. In one embodiment, a speech recognition program may be used 320 to convert the one or more received spoken words into text. In one embodiment, the speech recognition program may be a computer based speech recognition program.

If the communication message is not in the form of a voice message 305, it may be determined whether the communication message is in the form of an e-mail message 325. In one embodiment, the one or more words in the e-mail may be used 330 as text for the text title. In one embodiment, it may be determined whether the e-mail message has text denoted for the text title. In one embodiment, the sender may have text denoted for the text title. If the e-mail message has text denoted for the text title, a text title may be created with the text. In one embodiment, the e-mail message may not have denoted text for the text title. In one embodiment, the text in the text title may be less than a certain maximum number of characters. In one embodiment, abbreviations may be used. In one embodiment, pronouns and/or prepositions may be excluded from the text title to decrease the word count. The embodiments, however, are not limited to these examples. In one embodiment, the text in the text title may be the subject field in a simple mail transfer protocol (SMTP) e-mail message. In one embodiment, a text title may be created from a portion of the e-mail message. In one embodiment, a word frequency count program, a semantic reasoning program and/or other word summarization programs may be used to create text for the text title. In one embodiment, a priority level may be determined by a word summarization program. For example, an e-mail message with multiple explanation marks may indicate a high priority. In one embodiment, a priority level may be provided by the sender.

If the communication message is not in the form of a voice message 305 or an e-mail, it may be determined that the communication message is in the form of a text message. In one embodiment, a text message may include, but is not limited to, a short message service (SMS) message, an enhanced messaging service (EMS) message and/or a multi-media message service (MMS) message. In one embodiment, the one or more words in the text message may be converted 330 into text for the text title. In one embodiment, text in the text message may be denoted as text for the text title. In one embodiment, the sender may have text denoted for the text title. If the text message has text denoted for the text title, a text title may be created with that text. In one embodiment, no text may be denoted for the text title and a text title may be created by using a subject field of the text message, if a subject field is supported by the text messaging protocol. In one embodiment, no text may be denoted for the text title and the text title may be created using the body of the text message. In one embodiment, the text title may be created using the body of the text message via programs such as, but not limited to, a word frequency count, a semantic reasoning and/or other text summary programs. In one embodiment, the text in the text title must be less than a certain maximum number of characters. In one embodiment, abbreviations may be used. In one embodiment, pronouns and/or prepositions may be excluded from the text title to decrease the word count. The embodiments, however, are not limited to these examples.

Referring back to FIG. 2, the text title associated with the communication message may be displayed 230. In an embodiment, text displayed in the text title may include, but are not limited to, a priority level, a date and/or time of the communication message, a sender of the communication message, a type of communication message received, a purpose of the communication message received, and/or a summary or synopsis of the communication message. In one embodiment, the text title may display words, numbers, images, symbols and/or graphics. The embodiments, however, are not limited to these examples. As further illustrated in FIG. 4, the text title may be displayed on a mobile device. In one embodiment, the mobile device may have a separate screen for displaying the text title. In one embodiment, the text title may be displayed on the display screen in a secondary unit of a mobile device.

Figure 4:
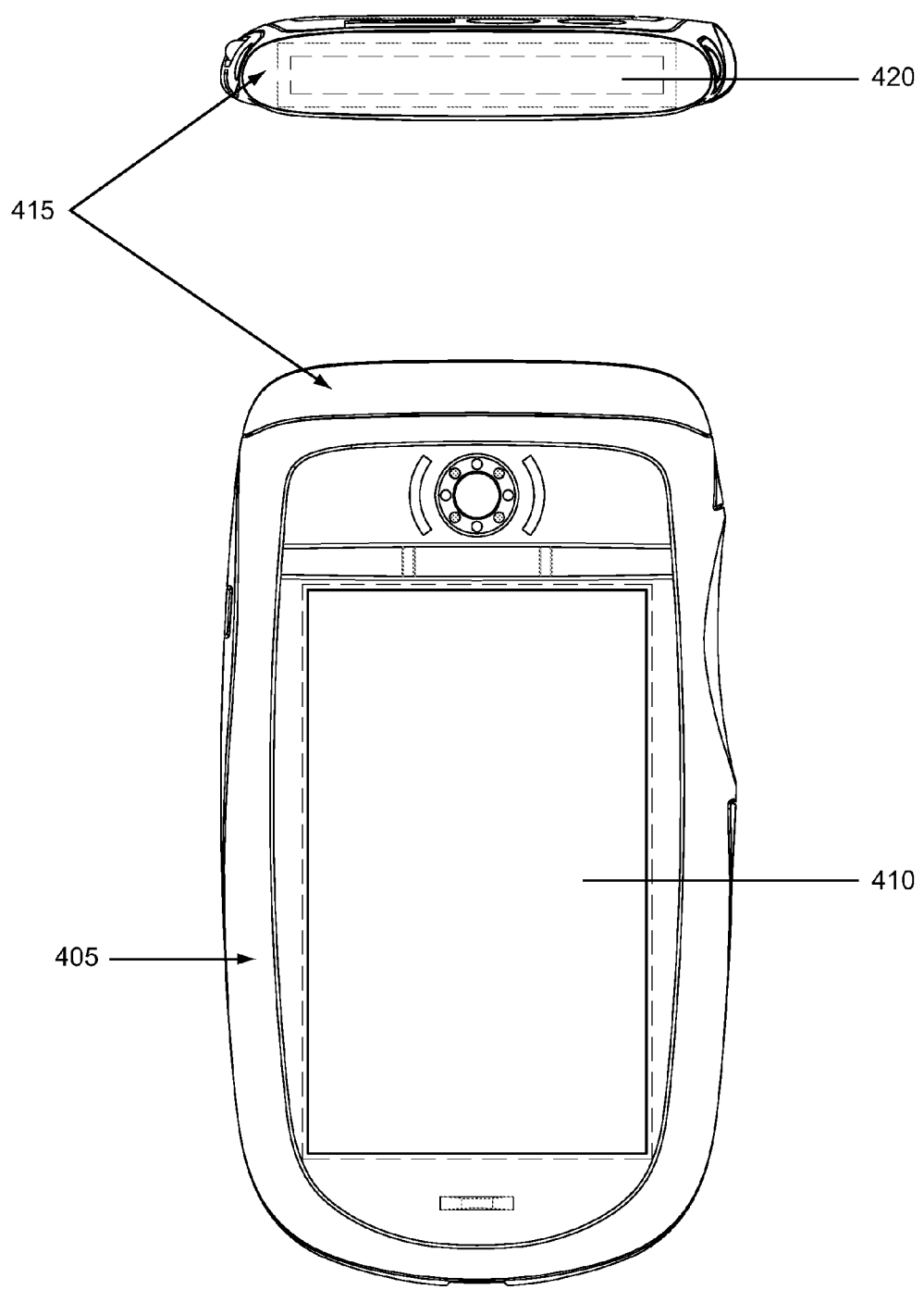
FIG. 4 illustrates one embodiment of an apparatus.

FIG. 4 illustrates one embodiment of a mobile device. In one embodiment, mobile device 110 of FIG. 1 may further include the components shown in FIG. 4. In one embodiment, a mobile device may comprise multiple elements, such as a plurality of sides and a plurality of display windows. The embodiments, however, are not limited to the elements shown in this figure.

In various embodiments, the mobile device may comprise a primary unit 405 and a secondary unit 415. In one embodiment, the primary unit 405 may include the memory, processor and wireless interface system discussed with regard to FIG. 1. In one embodiment, the primary unit 405 may include a front face for the mobile device. The primary unit 405 may include a display screen 410. In one embodiment, the dimensions of the secondary unit 415 may be smaller than the dimensions of the primary unit 405. In one embodiment, the primary unit 405 may be attached to the secondary unit 415. In one embodiment, the primary unit 405 may be adjacent to the secondary unit 415. In one embodiment, the primary unit 405 may include a front or main side of a mobile device and the secondary unit 415 may include an assembly located on a side of the mobile device. In one embodiment, the secondary unit 415 may be located on an edge of the mobile device. In one embodiment the secondary unit 415 may be located on a top side or edge of the mobile device. In one embodiment, the secondary unit 415 may include a side display assembly. In one embodiment, the secondary unit 415 may include at least a prism and a display screen 420. In one embodiment, the secondary unit 415 may include a display screen 420 to display a text title. The embodiments, however, are not limited to these examples.

Figure 5A:
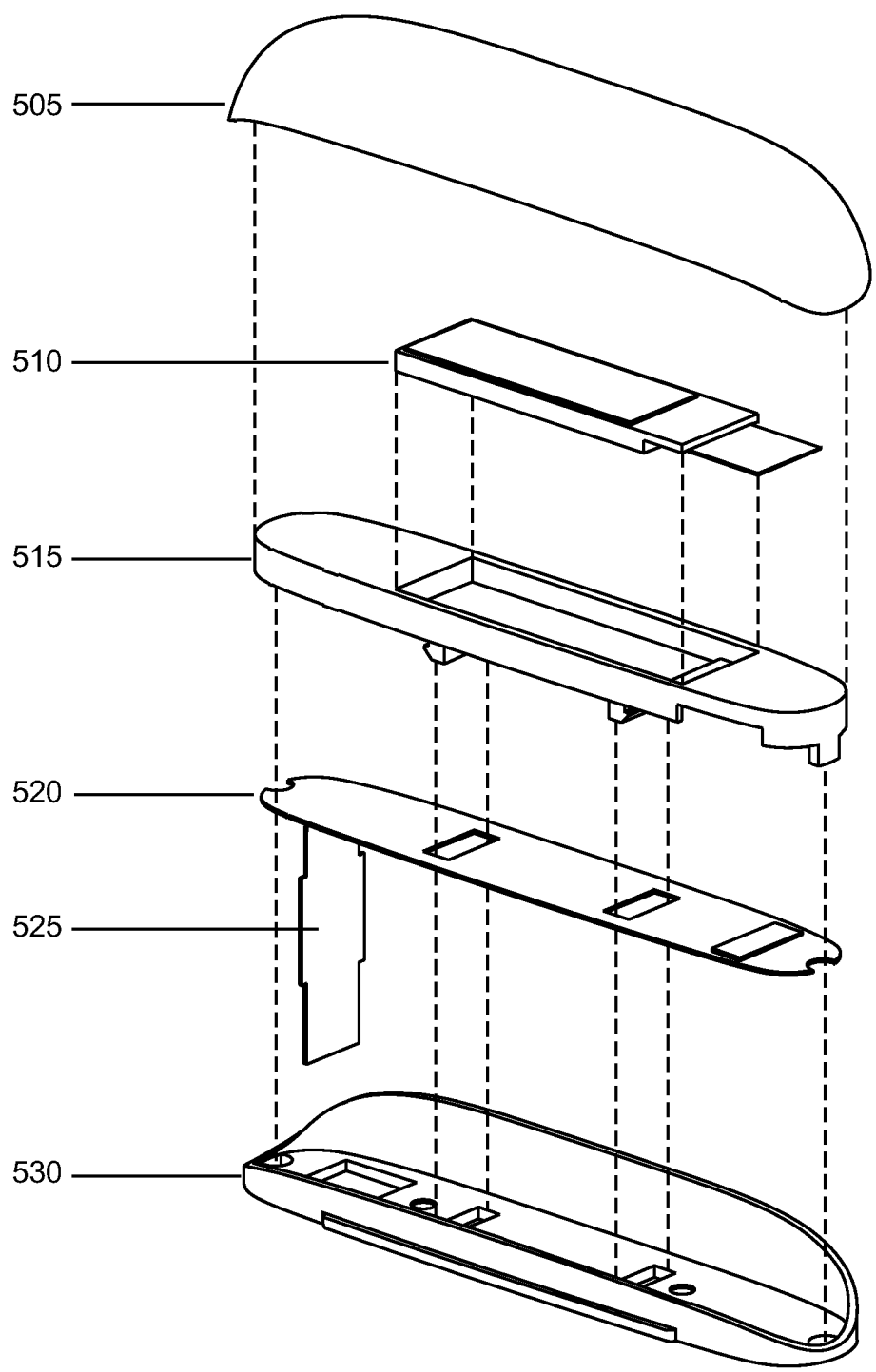
FIG. 5A illustrates one embodiment of a first exploded view of an apparatus.
Figure 5B:
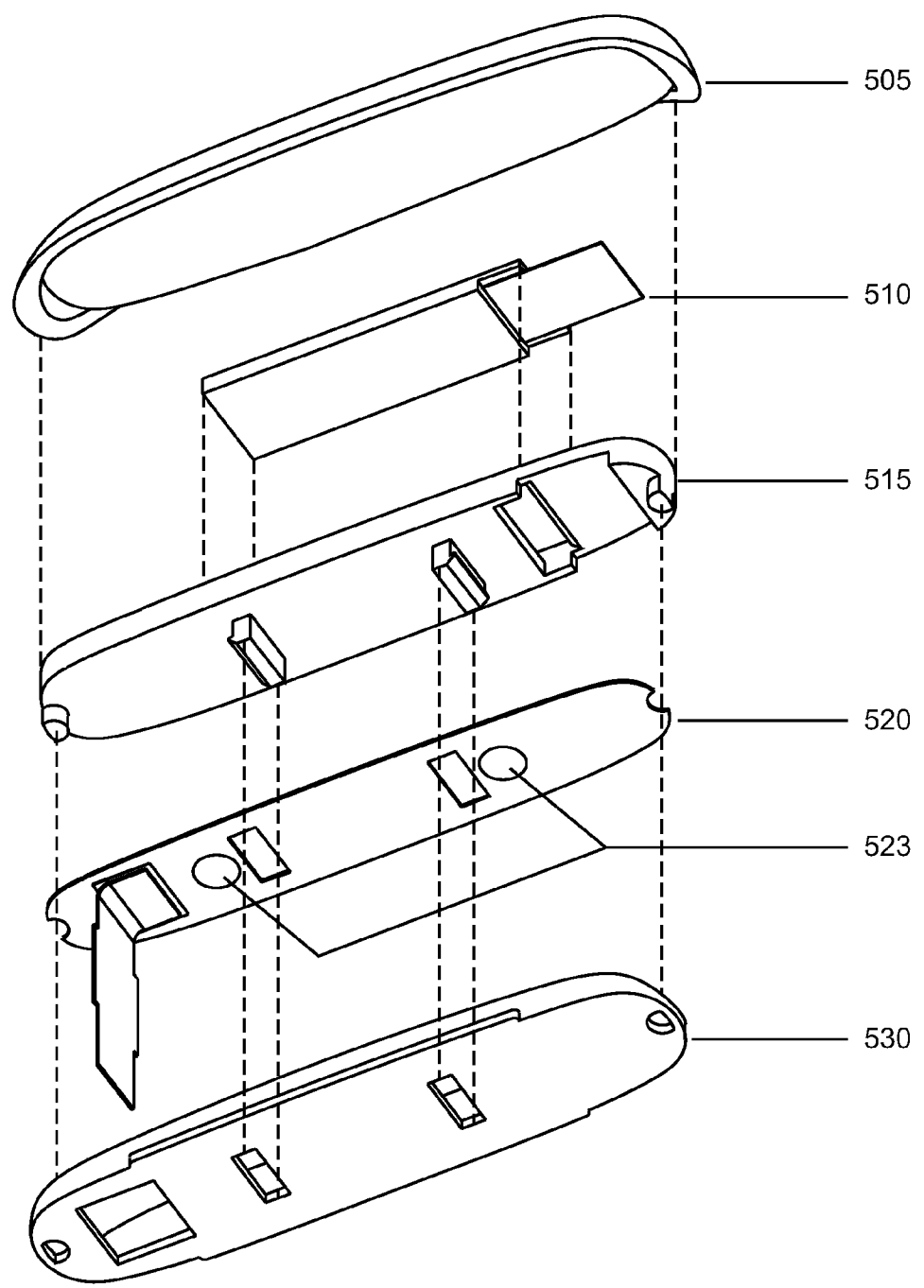
FIG. 5B illustrates one embodiment of a second exploded view of an apparatus.

FIG. 5A may illustrate a first exploded view of a secondary unit. FIG. 5B may illustrate a second exploded view of the secondary unit. As shown in FIGS. 5A and 5B, secondary unit may comprises multiple elements, such as a prism 505, a display 510, a display and PCB cradle 515, a PCB 520, a flexible connector 525 and a mounting base 530. The embodiments, however, are not limited to the elements shown in this figure.

In various embodiments, the secondary unit may comprise a prism 505. In one embodiment, the prism 505 may magnify text or other symbols appearing in a display 510. In one embodiment, the prism 505 may create an illusion that text appearing in a display is floating in the middle of the prism. In one embodiment, the prism 505 may be shaped so that the text on the display may be viewed from an oblique viewing angle. A prism 505 may be shaped in a spherical or a-spherical manner. In one embodiment, the prism may be asymmetric. In one embodiment, the prism may be lopsided as it may be flatter on one side and rounder on the other side. For example, the prism may be rounded toward the front face of the device to enable a user to read a side display screen when the device is laying flat on its back side. In one embodiment, the prism may provide a spherical lens to allow the text on the display to be read from an angle, such as, but not limited to, a 45 degree angle or a 60 degree angle from a center-plane running through a mid-plane between the front and back faces of the device. In one embodiment, the text may be readable from a viewing angle of up to approximately 60 degrees from a center-plane running through a mid-plane between the front and back faces of the device. In one embodiment, the text may be readable from viewing angle of up to 160 degrees from a center-plane running through a mid-plane between the sides of the device. The embodiments, however, are not limited to this example. In one embodiment, the prism may be made of an acrylic, polycarbonate and/or clear plastic material. The embodiments, however, are not limited to this example.

In various embodiments, the secondary unit may comprise a display 510. In one embodiment, the display 510 may comprise an organic light emitting diode (OLED) display. In one embodiment, an OLED display may be used as it provides better color saturation and viewing angles then a liquid crystal display (LCD). In one embodiment, the display 510 may comprise one or more OLED display screens. In one embodiment, the display screen 510, in the secondary unit, may be located on a side of the mobile device. In one embodiment, the display screen 510, in the secondary unit, may be located on the top side of the mobile device. In one embodiment, the display screen 510 may be a secondary display screen as the primary unit may include a primary display screen. In an embodiment, the one or more OLED display screens may be placed side by side and/or coplanar so as to appear as one continuous surface. For example, a display 510 may include three display screens and each screen may display a different type of communication message. In one embodiment, one or more display screens may be used to fill out an area on the secondary unit and/or to provide a greater viewing area. In one embodiment, the display 510 may be a material that is thin and easy to package. In one embodiment, the display 510 may provide high brightness and/or contrast. For example, the display may have a 2000:1 contrast. In one embodiment, the display 510 may have a wide aspect ratio.

In one embodiment, the display 510 may show text, symbols and/or images for a text title. In one embodiment, the display may be a monochromatic display. In one embodiment, the display may be a red/green/blue (RGB) display. In one embodiment, the display may include a background display color. For example, the screen may have a variety of background colors including, but not limited to, red, blue, yellow, white, clear, pink, green, etc. In one embodiment, the background color may be indicative of the priority level of the communication message. In one embodiment, the display may include a number, letter, symbol or image indicating the priority level of the text title. In one embodiment, the display may include scrolling text. In one embodiment, a text title appearing in the display 505 may have a maximum character length. The maximum character length may ensure that the entire text title can fit across the width of the display and be seen through the prism 505 without reliance on scrolling. In one embodiment, the text, characters, symbols and/or images displayed on the screen may be automatically orientated. In one embodiment, the display content may be based on the orientation of the device. An accelerometer in the device may be used to determine the orientation. For example, if the device is face down, the content may be oriented one way and if the device is face up, the content may be orientated a different way.

In various embodiments, secondary unit may comprise a display and PCB cradle 515. In one embodiment, the display and printed circuit board (PCB) cradle 515 may be made of plastic, acrylonitrile butadiene styrene (ABS) and/or an ABS polycarbonate blend. In one embodiment, the display 510 may be bonded to the prism 505 and the display and PCB cradle 515. In one embodiment, the prism 505, the display 510 and display and PCB cradle 515 may be bonded with the same adhesive. In one embodiment, the upper surface of the display may be optically bonded with the center of the lower surface of the prism. In one embodiment, the optical bonding may be, but is not limited to, a clear gel and/or a liquid adhesive. In one embodiment, the optical bonding may remove all air between the prism and the display. In one embodiment, the portion of the prism 505 that contacts the display and PCB cradle 515 may be bonded with a different adhesive. In one embodiment, the optical bonding may provide a refractive index such that the refractive index of the adhesive may match the refractive index of the outermost layer of the display 510 and/or the prism 505. In one embodiment, in addition to the optical bonding material, paint may be used to mask from view the portion of the cradle 515 surrounding the display 510. In one embodiment, only the display 510 may be viewed through the prism 505. The bottom of the prism 505 may be painted a dark color so that only the display 510 can be seen through the prism 505. In one embodiment, the paint may be an acrylic paint. The embodiment is not limited in this context. In one embodiment, areas at the bottom of the prism 505 may be painted so that the cradle 515 cannot be seen through the prism 505.

In various embodiments, secondary unit may comprise a printed circuit board (PCB) 520. Referring to FIG. 5B, the PCB may include one or more dome or contact switches 523. In one embodiment, the contact switches may include one or more dome shaped buttons and/or partial spherical domes. In one embodiment, the dome switches may be pressed to activate and/or make selections based on text shown on the display 510. In one embodiment, the dome switches may be activated when a user presses downward on the prism, pushing the upper, free floating portion of the secondary unit downward such that the dome switches are compressed against the mounting base 530. In an embodiment, the PCB 520 may be floating within the assembly between the prism 505 and the mounting base 530. In one embodiment, the upward travel of the PCB 520 may be limited by one or more barbs on the bottom of the display and PCB cradle 515.

In various embodiments, the secondary unit may comprise a flexible connector 525. In one embodiment, the flexible connector 525 may couple the PCB to an integrated circuit located inside the primary unit of the mobile device. The flexible connector 525 may be made of a flat flexible material such as, but not limited to, a flat flexible cable. In one embodiment, the flexible connector 525 may be an extension of the PCB, In various embodiments, the secondary unit may comprise a mounting base 530. In one embodiment, the mounting base 530 may couple or attach the secondary unit to the primary unit of the mobile phone. In one embodiment, the mounting base 530 may be mounted to the top side of the mobile phone assembly. In one embodiment, the mounting base 530 may include one or more ribs on a long side of the mounting base 530. In one embodiment, the mounting base 530 may include a rib on each of the long sides. In one embodiment, the one or more ribs of the mounting base 530 may be snapped into place. In one embodiment, the one or more ribs of the mounting base 530 may be two halves captured by the side of the primary unit of the mobile device. In one embodiment, the ribs of the mounting base 530 may be clam-shelled under the side of the primary unit of the mobile phone. In one embodiment, the one or more ribs may be used to lock the mounting base 530 to the rest of the mobile phone.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R.sctn. 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   receiving a communication message at a mobile device having a primary display and a secondary display, the primary and secondary displays comprising separate displays;
   determining whether the communication message is a voice message, an e-mail message or a text message;
   using one or more words from the voice message as text for a text title when the communication message is a voice message;
   using one or more words from the e-mail message as text for a text title when the communication message is an e-mail message;
   using one or more words from the text message as text for a text title when the communication message is a text message; and
   displaying the text title associated with the communication message on the secondary display, the secondary display including a prism arranged to create an illusion that the text title is floating in a middle of the prism and the prism is rounded toward a front face of a device to enable a user to read a side display screen when the device is lying flat on a back side of the device.

2. The method of claim 1, comprising:
   receiving one or more spoken words for the text title when the communication message is a voice message; and
   using a speech-to-text program to convert the one or more received words into text.

3. The method of claim 1, comprising:
   receiving one or more written words for the text title when the communication message is an e-mail message or a text message.

4. The method of claim 1, comprising:
   using one or more words from the e-mail message to create text for the text title via one or more of a summary program, a word frequency count program and a semantic reasoning program when the communication message is an e-mail message.

5. The method of claim 1, comprising:
   determining that the communication message is a text message;
   creating a text title with denoted text from the text message when the text message has text denoted for the text title; and
   creating a text title with a portion of the text message when the text message does not have text denoted for the text title.

6. The method of claim 1, comprising:
   determining that the communication message is an e-mail message;
   creating a text title with denoted text when the e-mail has denoted text for the text title; and
   creating a text title using a subject line of the e-mail as the text title when the e-mail does not have text denoted for the text title.

7. The method of claim 1, the text in the text title comprising less than a certain maximum number of characters.

8. An apparatus, comprising:
   a housing comprising a front face and a back side;
   a primary display;
   a secondary display comprising a prism arranged to create an illusion that a text title is floating in a middle of the prism and the prism is rounded toward the front face of the housing to enable a user to read a side display screen when the apparatus is lying flat on the back side, the primary and secondary displays comprising separate displays; and
   processing circuitry coupled with the primary display and the secondary display, the processing circuitry to:
      receive a communication message,
      determine whether the communication message is a voice message, an e-mail message or a text message,
      use one or more words from the voice message as text for the text title when the communication message is a voice message,
      use one or more words from the e-mail message as text for the text title when the communication message is an e-mail message,
      use one or more words from the text message as text for the text title when the communication message is a text message, and
      display the text title associated with the communication message on the secondary display.

9. The apparatus of claim 8, the processing circuitry to receive one or more spoken words for the text title when the communication message is a voice message and to convert the one or more received words into text.

10. The apparatus of claim 8, the processing circuitry to receive one or more written words for the text title when the communication message is an e-mail message or a text message.

11. The apparatus of claim 8, the processing circuitry to use one or more words from the e-mail message to create text for the text title via one or more of a summary program, a word frequency count program and a semantic reasoning program when the communication message is an e-mail message.

12. The apparatus of claim 8, the processing circuitry to determine that the communication message is a text message create a text title with denoted text from the text message when the text message has text denoted for the text title, and create a text title with a portion of the text message when the text message does not have text denoted for the text title.

13. The apparatus of claim 8, the processing circuitry to determine that the communication message is an e-mail message, create a text title with denoted text when the e-mail has denoted text for the text title, and create a text title using a subject line of the e-mail as the text title when the e-mail does not have text denoted for the text title.

14. The apparatus of claim 8, the text in the text title comprising less than a certain maximum number of characters.

15. An article comprising a non-transitory machine-readable storage medium containing instructions that when executed enable a system to:
   receive a communication message at a mobile device having a primary display and a secondary display, the primary and secondary displays comprising separate displays;
   determine whether the communication message is a voice message, an e-mail message or a text message;
   use one or more words from the voice message as text for a text title when the communication message is a voice message;
   use one or more words from the e-mail message as text for a text title when the communication message is an e-mail message;
   use one or more words from the text message as text for a text title when the communication message is a text message; and
   display the text title associated with the communication message on the secondary display, the secondary display including a prism arranged to create an illusion that the text title is floating in a middle of the prism and the prism is rounded toward a front face of a device to enable a user to read a side display screen when the device is lying flat on a back side of the device.

16. The article of claim 15 comprising instructions that when executed enable a system to:
   receive one or more spoken words for the text title when the communication message is a voice message; and
   use a speech-to-text program to convert the one or more received words into text.

17. The article of claim 15 comprising instructions that when executed enable a system to receive one or more written words for the text title when the communication message is an e-mail message or a text message.

18. The article of claim 15 comprising instructions that when executed enable a system to use one or more words from the e-mail message to create text for the text title via one or more of a summary program, a word frequency count program and a semantic reasoning program when the communication message is an e-mail message.

19. The article of claim 15 comprising instructions that when executed enable a system to:
   determine that the communication message is a text message;
   create a text title with denoted text from the text message when the text message has text denoted for the text title; and
   create a text title with a portion of the text message when the text message does not have text denoted for the text title.

20. The article of claim 15 comprising instructions that when executed enable a system to
   determine that the communication message is an e-mail message;
   create a text title with denoted text when the e-mail has denoted text for the text title; and create a text title using a subject line of the e-mail as the text title when the e-mail does not have text denoted for the text title.

\* \* \* \* \*